United States Patent [19]
Hutchinson, IV et al.

[11] Patent Number: 5,812,607
[45] Date of Patent: Sep. 22, 1998

[54] METHOD AND APPARATUS FOR PROCESSING WIDEBAND DATA IN A DIGITAL CELLULAR COMMUNICATION SYSTEM

[75] Inventors: James A. Hutchinson, IV, San Diego; Jan C. Ault, Santee, both of Calif.

[73] Assignee: Qualcomm Incorporated, San Diego, Calif.

[21] Appl. No.: 595,320

[22] Filed: Feb. 1, 1996

[51] Int. Cl.[6] .............................. H03D 3/00; H03K 9/06
[52] U.S. Cl. ........................................ 375/322; 375/325
[58] Field of Search .................................. 375/202, 206, 375/322, 325; 371/36

[56] References Cited

U.S. PATENT DOCUMENTS

| | | | |
|---|---|---|---|
| 4,404,674 | 9/1983 | Rhodes | 371/43 |
| 4,635,279 | 1/1987 | Nossen | 375/78 |
| 4,780,885 | 10/1988 | Paul et al. | 375/40 |
| 4,955,083 | 9/1990 | Phillips et al. | 455/47 |
| 5,179,360 | 1/1993 | Suzuki | 332/103 |
| 5,198,992 | 3/1993 | McCaslin | 364/724.09 |
| 5,440,269 | 8/1995 | Hwang | 329/318 |
| 5,457,702 | 10/1995 | Williams et al. | 371/379 |
| 5,551,078 | 8/1996 | Connell et al. | 455/343 |
| 5,640,444 | 6/1997 | O'Sullivan | 379/59 |

Primary Examiner—Stephen Chin
Assistant Examiner—Mohammad Ghayour
Attorney, Agent, or Firm—Russell B. Miller; Roger W. Martin

[57] ABSTRACT

A system and method for processing wideband data within digital FM transceiver. A digital FM demodulator within the transceiver produces a demodulated information signal in response to the FM signal. The digital FM receiver also includes a wideband message processing section for recovering message information from the demodulated information signal. A word register circuit within the wideband message processing section stores one or more repetitions of a message word recovered from the demodulated information signal. During operation of the FM receiver in a control channel mode, a dotting detector within the wideband processing section is used for detecting a first dotting sequence within the demodulated information signal. Similarly, the dotting detector serves to detect a second dotting sequence within the demodulated information signal during operation in a voice channel mode. A word sync sequence is also identified within the demodulated information signal prior to storage of the one or more repetitions of the received message word within the word register circuit. A reconstructed message word is then generated by comparing corresponding bits within the one or more repetitions of the one message word. A message prefilter determines whether a processor interrupt should be generated by ascertaining whether the reconstructed message word is of a predefined type. A digital FM transmitter of the transceiver is controlled on the basis of busy-idle channel status information recovered from the demodulated information signal.

18 Claims, 12 Drawing Sheets

METHOD AND APPARATUS FOR PROCESSING WIDEBAND DATA IN A DIGITAL CELLULAR COMMUNICATION SYSTEM

BACKGROUND OF THE INVENTION

I. Field of the Invention

The present invention relates generally to frequency modulated (FM) communication systems. More particularly, the present invention relates to novel and improved wideband digital FM processing in a dual-mode communication system selectively operative in either FM or code division multiple access (CDMA) modes.

II. Description of the Related Art

The demodulation of received FM communication signals is routinely performed using analog signal processing techniques. However, methods have recently been developed which allow analog communication signals to be processed using digital signal processing techniques. Included among such techniques are methods of phase sampling and discrimination of an incoming signal to recover message information. The message information is often recovered by using, for example, quadrature detection processes.

Within digital FM receivers, a number of techniques have been employed to effect digital FM demodulation. Commonly used techniques include IF demodulation using zero crossing counts, or baseband demodulation using quadrature detection.

One FM demodulation technique suitable for digital implementation is known as "direct conversion". Using this technique, a direct conversion, or "zero-IF" receiver mixes the incoming RF signal directly down to baseband. The advantage of direct conversion is that channel selectivity filtering can be performed at baseband, and hence is conveniently implemented using integrated circuit technology. One disadvantage of direct conversion demodulation is the unwanted DC offset voltages which may appear at the output of the mixer together with the desired baseband signal, which may also contain DC spectral components. The undesired DC offset voltage may arise from DC offsets originating within the mixer stage, as well as from RF local oscillator leakage being mixed down to DC.

A digital FM receiver substantially overcoming the disadvantages inherent in FM receivers reliant upon direct conversion FM demodulation is described in copending U.S. patent application Ser. No. 08/373,122, filed Dec. 4, 1994, and entitled DUAL-MODE DIGITAL FM COMMUNICATION SYSTEM, which is assigned to the assignee of the present invention and which is herein incorporated by reference. In particular, a novel dual-mode digital communication system is disclosed in which information signals are processed during operation in both frequency-modulated (FM) mode and code division multiple-access (CDMA) modes. The digital communication system includes a dual-mode transmitter for transmitting the information signal using an FM communication signal during FM mode operation, and for transmitting the information signal using a spread spectrum QPSK signal during CDMA mode operation.

The communication system further includes a dual-mode receiver for receiving the FM communication signal during FM mode operation, and for receiving the spread spectrum QPSK signal during CDMA mode operation. The dual mode receiver further includes a digital demodulator for recovering the information signal from the received FM signal during operation in the FM mode and for recovering the information signal from the received QPSK signal during CDMA mode operation.

An FM demodulator included within the digital demodulator of the dual-mode receiver converts the digitized received baseband FM communication signal, centered about a predefined baseband frequency offset from the zero frequency, into the recovered information signal. Since the digitized received baseband FM communication signal is offset from the zero frequency, any spurious DC offsets or noise are prevented from corrupting from the integrity of the recovered information signal.

Although describing a dual-mode receiver system well-suited to provide accurate digital demodulation of received FM communication signals, application Ser. No. 08/373,122 does not describe a technique for the subsequent extraction of message information from the recovered information signal. As is well known, IS-95 provides a protocol for transmission of message information to mobile stations (e.g., cellular telephones) over both the forward analog control channel (FOCC) and the forward voice channel (FVC). In particular, the following types of messages are transmitted over the FOCC: a Mobile Station Control Message, an Overhead Message, and a Control-Filler Message. The Mobile Station Control Message is the only type of message transmitted by way of the continuous wideband data stream of the FVC.

Message transmission over both the FOCC and the FVC is accompanied by a dotting sequence and a word sync sequence. These sequences permit mobile stations to achieve synchronization with the subsequently received message data. Each incoming data word is repeated five times, and is referred to as a word block. For a multi-word message, the second word block and subsequent word blocks are formed in the same manner as the initial word block, and are also preceded by dotting and word sync sequences. Each word is formed using a known generator polynomial corresponding to a predefined BCH code.

On the FOCC, three discrete information streams (i.e., stream A, stream B, and a busy-idle stream) are time-multiplexed together. The busy-idle stream includes busy-idle bits, interspersed among the received time-multiplexed information stream, which are used to indicate the current status of the reverse control channel. It is important that the status of each busy-idle bit be quickly identified, since this allows transmission from the mobile unit over an already "busy" reverse control channel to be quickly suspended. Unfortunately, existing message processing routines implemented in software can be relatively slow in recognizing such changes in busy-idle status.

The message processing software typically used in many currently available cellular telephones leads to other inefficiencies as well. For example, during operation in the FOCC mode the message processing software in the mobile station typically may process all of the received Message Station Control Messages, Control Filler Messages, and Overhead Messages, and messages directed to other mobile stations. However, only certain of these messages may be pertinent to the operation of any given mobile station, and hence processing resources may be unnecessarily expended.

SUMMARY OF THE INVENTION

The present invention relates to a novel system and method for processing wideband data in a digital FM transceiver. In an exemplary implementation, the present invention is incorporated within a dual-mode digital communications unit capable of operation in FM and CDMA modes. The dual-mode communications unit includes a digital FM receiver for receiving a frequency-modulated (FM) signal. Within the digital FM receiver a digital FM demodulator produces a demodulated information signal in response to the FM signal. The digital FM receiver also includes a wideband message processing section for recovering message information from the demodulated information signal. A word register circuit within the wideband message processing section stores one or more repetitions of a message word recovered from the demodulated information signal.

The digital FM receiver may be configured for operation in a control channel mode and in a voice channel mode. During operation in the control channel mode, a dotting detector within the wideband processing section is used for detecting a first dotting sequence within the demodulated information signal. Similarly, the dotting detector serves to detect a second dotting sequence within the demodulated information signal during operation in the voice channel mode. Upon detection of such a dotting sequence, a word sync sequence is identified within the demodulated information signal prior to storage of the one or more repetitions of the received message word within the word register circuit.

In a preferred implementation the wideband message processing section further includes a majority vote circuit coupled to the word register circuit. The majority vote circuit is disposed to generate a reconstructed message word by comparing corresponding bits within the one or more repetitions of the one message word. The wideband processing section may further include an error correction circuit for error-correcting the reconstructed message word in order to produce an error-corrected message word. A message prefilter may be used to determine whether a communications unit processor should be interrupted to read the error corrected message word by ascertaining whether it is of a predefined type.

The dual-mode digital communications unit may also include a digital FM transmitter for transmitting an FM communication signal. In a preferred implementation the digital FM transmitter is controlled on the basis of channel status information recovered from the demodulated information signal by the wideband message processing section.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
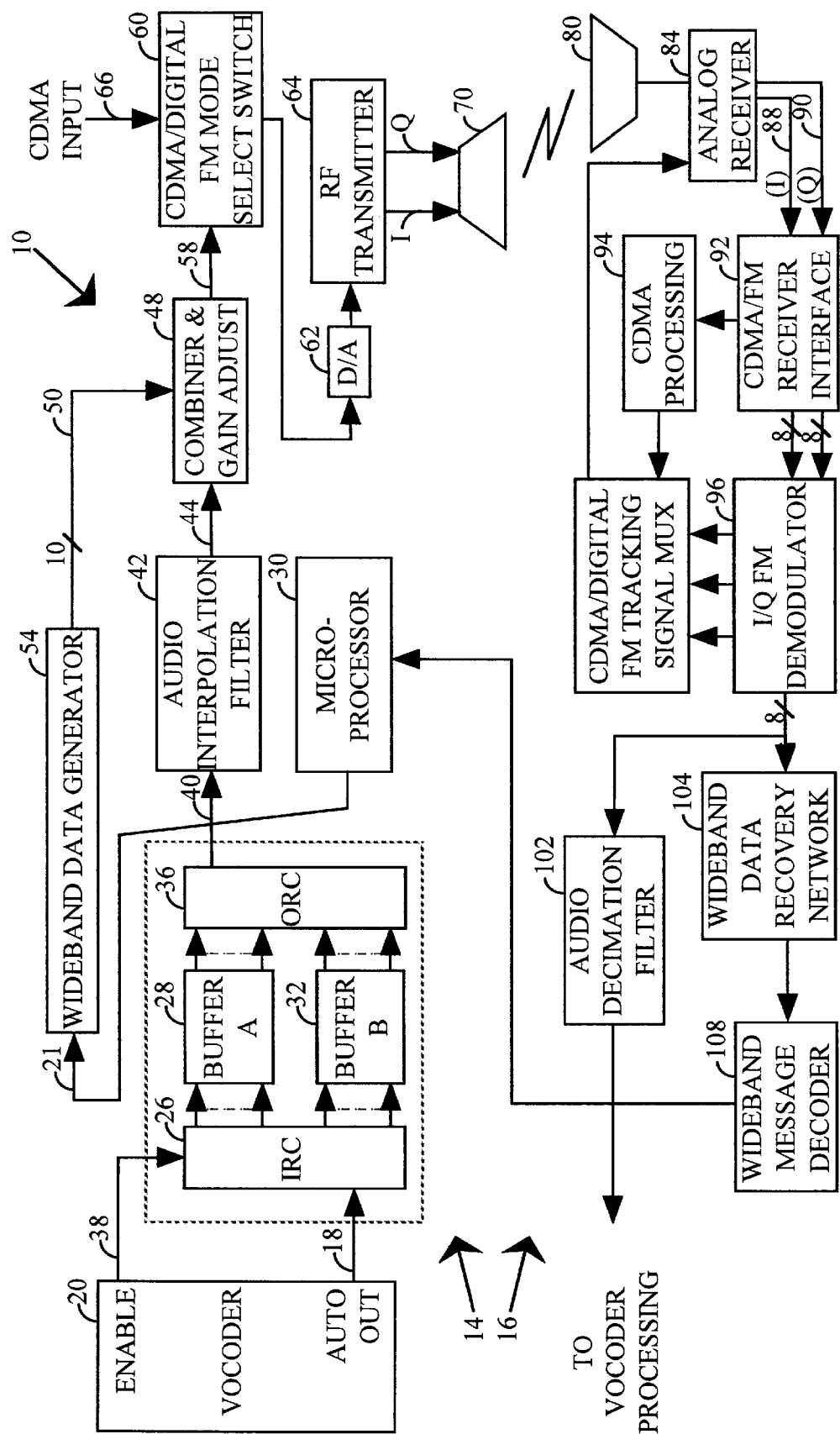
FIG. 1 provides an illustrative representation of an exemplary dual-mode digital communications unit in which is incorporated a preferred embodiment of a wideband digital communications transceiver of the invention.

FIG. 1 provides an illustrative representation of an exemplary dual-mode digital communications unit 10 in which is incorporated a preferred embodiment of a wideband digital communications transceiver of the invention. The dual-mode communications unit 10 includes a dual-mode transmitter 14 disposed to transmit digital information signals to a dual-mode digital receiver 16. In a digital FM mode, the transmitted digital information signals are generated within the dual-mode transmitter through FM modulation of an RF carrier on the basis of digitized audio and wideband data signals. During a multiple access mode of operation, the transmitted information signals comprise, for example, code-division multiple-access (CDMA) information signals. An FM/CDMA mode select signal provided to transmitter 14 by a control processor (not shown) allows selection of either the digital FM or CDMA mode of operation.

I. Overview of Dual-Mode Transmitter

Referring to FIG. 1, the digital FM processing chain of transmitter 14 is configured to receive sampled audio information signals 18 from a digital signal processor (DSP) 20, as well as to receive a serial stream of binary message data 21 from a microprocessor 30. In an exemplary embodiment, the sampled (e.g., 12-bit) audio information signals 18 are provided to an audio interpolation filter 42 of transmitter 14 at a rate of 20 kilosamples/second (ksps). The interpolation filter 42 converts the 20 ksps sampled audio data into a 120 ksps stream of sampled audio data 44, where each audio sample 44 consists of 10 bits. The sampled audio data 44 is then combined within a combiner & gain adjust network 48 with a sampled wideband data waveform 50 provided by a wideband data waveform generator 54.

The composite digital FM modulation signal 58 produced by the combiner & gain adjust network 48 is provided to a mode select switch 60 within the CDMA/FM transmit interface. During digital FM mode operation, the CDMA/FM mode select switch 60 supplies the digital FM modulation signal to a digital to analog converter (DAC) 62. Within an RF transmitter 64 the resultant analog FM modulation signal directly modulates the frequency of an intermediate frequency carrier. Further details of a preferred manner in which the digital FM modulation signal is generated are provided in copending application Ser. No. 08/373,122.

Upon switching from operation in the digital FM mode to operation in the CDMA mode, a CDMA data signal carried by CDMA input line 66 is supplied to the RF transmitter 64 in lieu of the digital FM mode modulation signal. During CDMA mode operation the transmitter 64 generates in-phase (I) and quadrature phase (Q) pseudo-random noise sequences $PN_I$ and $PN_Q$, which typically correspond to a particular area (i.e., cell) to which information is transmitted during CDMA mode operation. Within transmitter 64 the CDMA data signal is XOR'ed with the $PN_I$ and $PN_Q$ sequences so as to spread the CDMA data signal prior to transmission. The resulting I-channel code spread sequence and Q-channel code spread sequences are used to bi-phase modulate a quadrature pair of sinusoids. The modulated sinusoids are summed, band-pass filtered, shifted to an RF frequency, and again filtered and amplified prior to being radiated via antenna 70 over a communication channel to dual-mode receiver 16. An exemplary CDMA transmitter and waveform generator is described in, for example, U.S. Pat. No. 5,103,459, issued Apr. 7, 1992, entitled "System and Method for Generating Signal Waveforms in a CDMA Cellular Telephone System" which is assigned to the assignee of the present invention and which is herein incorporated by reference.

II. Overview of Dual-Mode Receiver

Again referring to FIG. 1, the dual-mode receiver 16 includes a receive antenna 80 for receiving the I and Q channel information signals transmitted by dual-mode transmitter 14. During both CDMA and digital FM mode operation, the I and Q channel information signals received by antenna 80 are processed by a direct conversion analog receiver 84. Within the analog receiver 84, the I and Q channel information signals are mixed with a local oscillator signal to produce in-phase (I) and quadrature-phase (Q) baseband signals. During digital FM mode operation the local oscillator frequency is selected to be offset by a predetermined margin from the RF carrier frequency. In this way the received I and Q information signals are converted to I and Q digital FM baseband signals offset from zero frequency, i.e., from a "zero-IF", by the predetermined margin.

As mentioned previously, within conventional direct conversion FM receivers any undesired DC signal energy included within the input waveform is mapped directly to zero-frequency baseband, about which are centered the desired quadrature baseband signal components. As a result, the subsequent estimates of phase angle may become corrupted in the presence of significant extraneous DC signal energy. In accordance with the invention, the frequency offset purposely introduced within the analog receiver 84 allows such undesired DC signal energy to be removed during processing of the baseband I and Q signals.

During CDMA mode operation, the I and Q channel baseband CDMA signal components are seen to be provided via receiver output lines 88 and 90 to analog to digital converters (ADCs) 92 of the CDMA/FM receiver interface. The baseband CDMA signal components are then transferred from the ADCs 92 to a CDMA processing network 94. Within the CDMA processing network 94, the baseband CDMA signal components are demodulated, deinterleaved and decoded in, for example, a manner such as is described in the above-referenced U.S. Pat. No. 5,103,459.

During digital FM mode operation, the baseband I and Q signals are provided to the ADCs 92 over the receiver output lines 88 and 90. Within the ADCs 92, the baseband I and Q signals are digitized at an exemplary rate of 40 kilosamples/second (ksps) to form 8-bit in-phase (I) and 8-bit quadrature-phase (Q) samples. The 8-bit I and Q samples are output at the exemplary 40 ksps rate to the I/Q FM demodulator 96. Within the digital FM demodulator 96 the I and Q baseband signals are demodulated into a phase signal, and are then further converted into a demodulated frequency signal. The digital FM demodulator 96 also includes a DC offset tracking loop for removing the DC offset introduced during RF processing within the receiver 84, an automatic gain control (AGC) loop, and a frequency tracking loop.

Referring again to FIG. 1, during digital FM mode operation the demodulated frequency signal is provided at an exemplary 40 ksps data rate to both an audio decimation filter 102, and to a wideband data recovery network 104. After being processed by the decimation filter 102, the down-sampled audio signal is passed to a vocoder (not shown) for recovery of the received audio information. Contemporaneously, the wideband data recovery network 104 facilitates the wideband data processing contemplated by the invention by extracting the received wideband data and timing information from the demodulated frequency signal. This extracted wideband signal information is then provided to a receive (RX) wideband message processing section 108. As is described hereinafter, the RX wideband message processing section 108 functions in accordance with the invention to identify wideband data word frames, correct bit errors, and to forward the identified data words and messages to the microprocessor 30 for further evaluation.

Other details the dual-mode transmitter 14 and of the dual-mode digital receiver 16 of the dual-mode communications unit 10 are set forth in the above-referenced copending application Ser. No. 08/373,122, the disclosure of which is herein incorporated by reference.

III. Wideband Data and Clock Recovery

Figure 2:
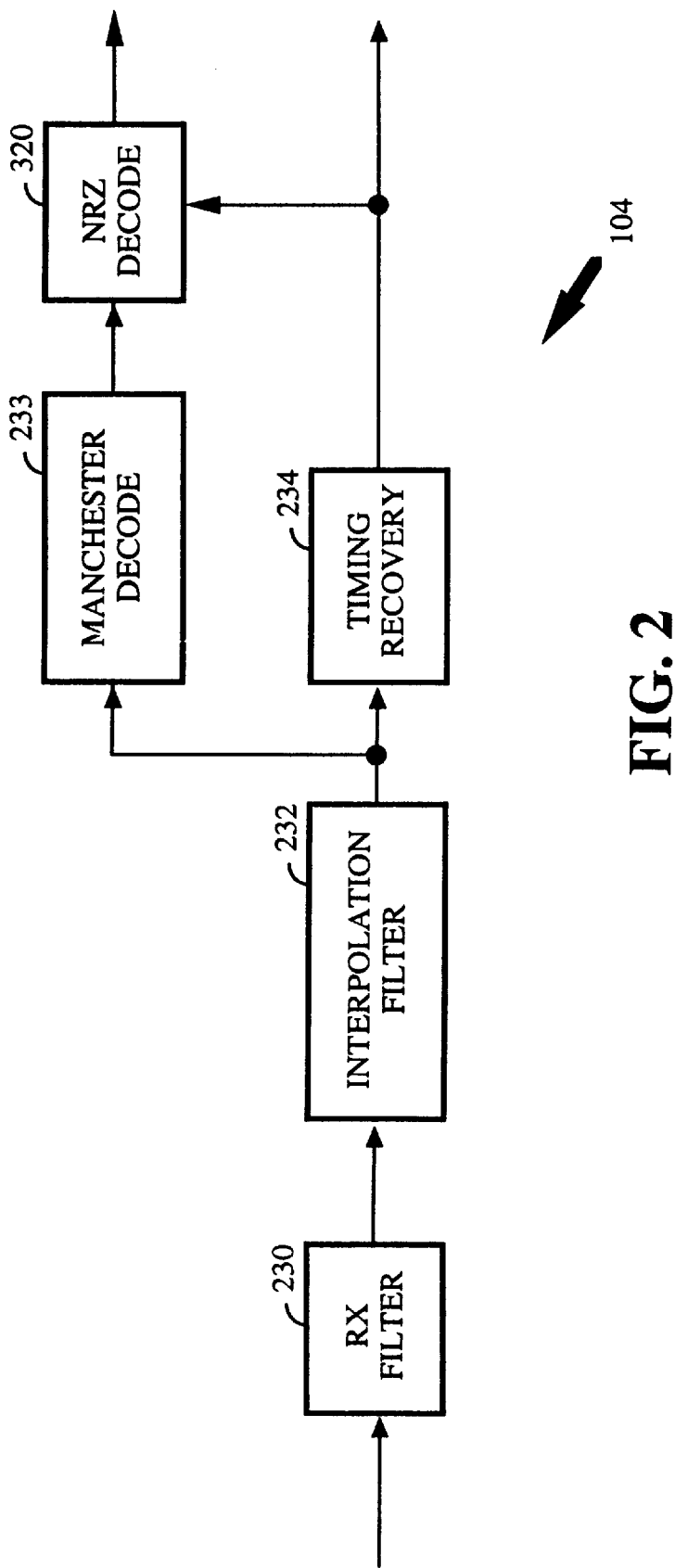
FIG. 2 illustratively represents the architecture of an exemplary implementation of a wideband data recovery network.

Turning now to FIG. 2, there is illustratively represented the architecture of an exemplary implementation of the wideband data recovery network 104. The wideband data recovery network 104 is disposed to perform timing recovery and decoding operations upon the Manchester-encoded data stream received by the dual-mode receiver 16. The network 104 includes a receiver (RX) filter 230, which approximates a matched filter for the Manchester symbol stream. In addition, the RX filter 230 band-limits the demodulated FM signal and rejects any high-frequency noise produced by the phase to frequency generator 218. In an exemplary implementation the RX filter 230 is designed to emulate the characteristics of an analog $4^{th}$-order Butterworth low-pass filter having a cut-off frequency of approximately 13 kHz. Given that the demodulated FM signal is generated by the I/Q demodulator at an exemplary 40 ksps rate, the RX filter 230 may be realized as a 2-tap SINC filter (zero at 20 ksps), having a z-domain transfer function of $(1+z-1)/2$.

Figure 3:
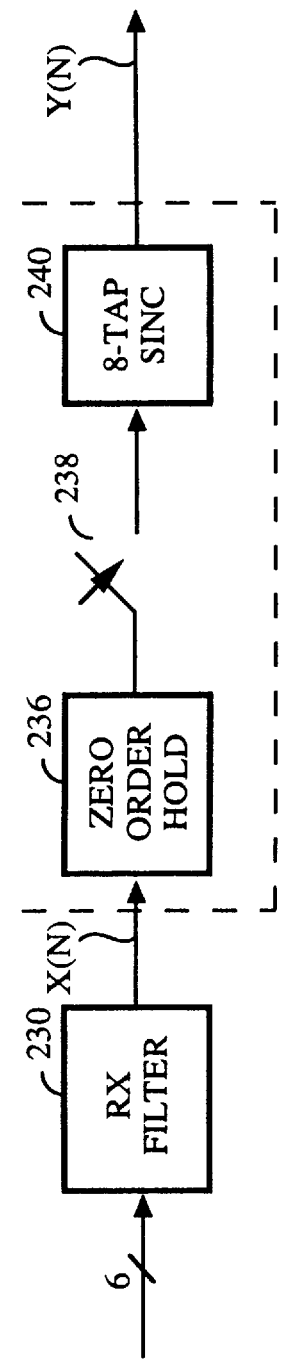
FIG. 3 is a block diagram of an interpolation filter included within the wideband data recovery network.
Figures 4A, 4B:
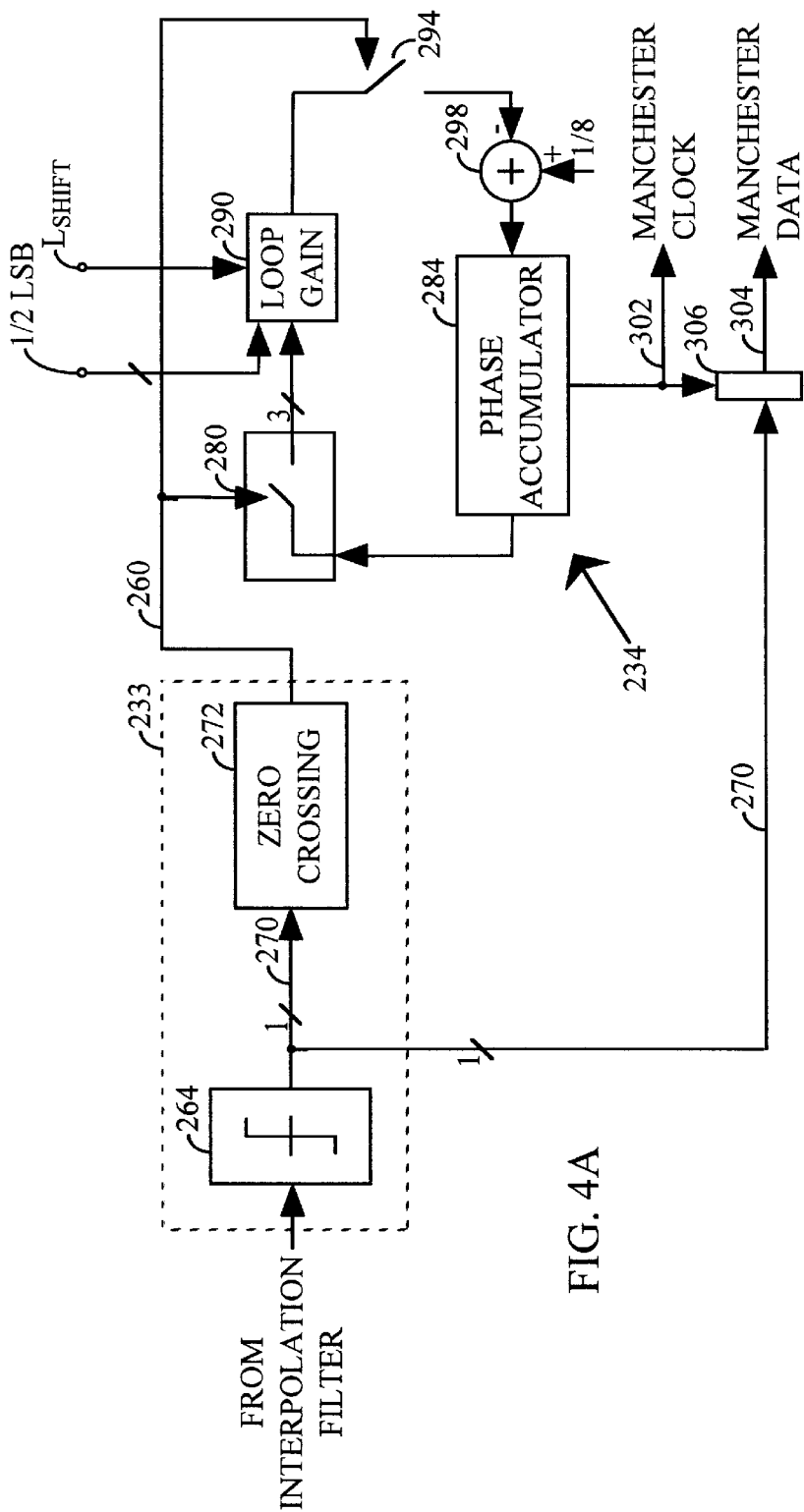
FIG. 4A shows block diagrams of timing recovery and Manchester decode networks.
FIG. 4B sets forth the time constants and loop bandwidths associated with a phase-locked loop within the Manchester decode network.

Referring again to FIG. 2, an interpolation filter 232 is provided for increasing the sample rate of the filtered signal produced by the RX filter 230 so as to achieve a sample resolution suitable for processing by timing recovery and Manchester decode networks 233 and 234. The interpolation filter 232 is shown in greater detail in FIG. 3, and is seen to include a zero order hold 236 for receiving the 40 ksps stream of samples from the RX filter 230. A switch 238 is provided for re-sampling the output of the zero order hold 236 at an exemplary rate of 320 ksps in order to provide the requisite time resolution for timing recovery and detection of the 20 ksps Manchester stream. The resultant re-sampled 320 ksps sample stream is filtered by an 8-tap SINC filter 240 having a transfer function of (1+z-1+. . . +z-7)/8. The resultant linearly interpolated sequence Y(n) produced by the 8-tap SINC filter 240 in response to a sequence X(n) generated by the RX filter 230 may be represented as follows:

$Y(8n+k)=X(n)$, for $k=0$; and $Y(8n+k)=Y(8n+k-1)+(X(n)-X(n-1))/8$, for $k=1, \ldots, 7$ Turning now to FIG. 4A, block diagrammatic representations are provided of the timing recovery and Manchester decode networks 233 and 234. In an exemplary embodiment the Manchester decode network 234 is realized using a 1st order digital phase-locked loop (DPLL), the timing of which is governed by zero-crossings 260 produced by the timing recovery network 233. As is indicated by FIG. 4A, the timing recovery network 233 includes a data thresholding circuit 264 for providing thresholded data bits 270 at the interpolated rate of 320 ksps to a zero-crossing circuit 272. The thresholded data bits 270 are produced based on the sign of the input sample sequence. Specifically, each zero-crossing 260 is produced within zero-crossing circuit 272 by XOR'ing successive ones of the thresholded data bits 270.

The DPLL of the Manchester decode network 234 is designed to lock to the exemplary Manchester symbol rate of 20 ksps. The decode network 234 includes a zero-crossing sampled phase detector 280, which is operative to sample the output of a phase accumulator 284 upon generation of each zero-crossing 260. In a preferred embodiment the phase detector 280 produces a 3-bit error signal extracted from the 3 most significant bits (MSBs) of the phase accumulator, to which a ½ least significant bit (LSB) offset is added in order to produce an unbiased 4-bit phase error estimate. Each detected phase sample produced by the phase detector 280 is bit-shifted within a loop gain scaling register 290 in accordance with a loop gain shift ($L_{SHIFT}$) command from the receiver control processor. The magnitude of the bit-shift carried out within scaling register 290 determines the time constant and, hence, the bandwidth of the DPLL within network 234. The time constants and loop bandwidths associated with an exemplary set of $L_{SHIFT}$ values are set forth in FIG. 4B. As is indicated by FIG. 4B, in a preferred embodiment the $L_{SHIFT}$ values range from 5 to 8, which corresponds to a loop bandwidth range of between 80 Hz to 10 Hz.

Again referring to FIG. 4A, the phase accumulator 284 is updated in identical phase increments at an exemplary rate of 320 kHz. In an exemplary implementation each fixed phase increment is selected to be ⅛, which results in the accumulator 284 ramping from −1 to +1 once every Manchester symbol of 16 clock cycles at 320 kHz. The phase accumulator 284 will generally be implemented to wrap upon overflow from ±1.

In operation, the DPLL of FIG. 4A will phase lock such that the zero-crossings 260 of the input signal coincide with zero-crossings of the ±1 output from phase accumulator 284. Although in principle this results in an average sampled phase error of zero from the phase detector 280, various factors (e.g., quantized time resolution and signal noise) ensure continuous loop operation by causing a non-zero sampled phase error. As a specific operational example, consider the case where the ±1 signal transitions from the phase accumulator 284 are "leading" the zero-crossings 260 of the input signal. In this instance the resultant positive error signal is subtracted from the next ⅛ phase increment provided to subtractor 298, thereby reducing the phase lead of the output of accumulator 284 relative to the input zero-crossings 260.

Referring to FIG. 4A, the recovered Manchester clock 302 may be derived from the sign of the phase error accumulated within accumulator 284. During phase lock, positive transitions of the recovered Manchester clock 302 correspond to inter-symbol transitions of the recovered Manchester data 304 produced by latch 306. More particularly, the Manchester data 304 is generated by latching, in latch 306, the thresholded data signal 470 on the falling edge of the recovered Manchester clock signal 302.

Figures 5A, 5B:
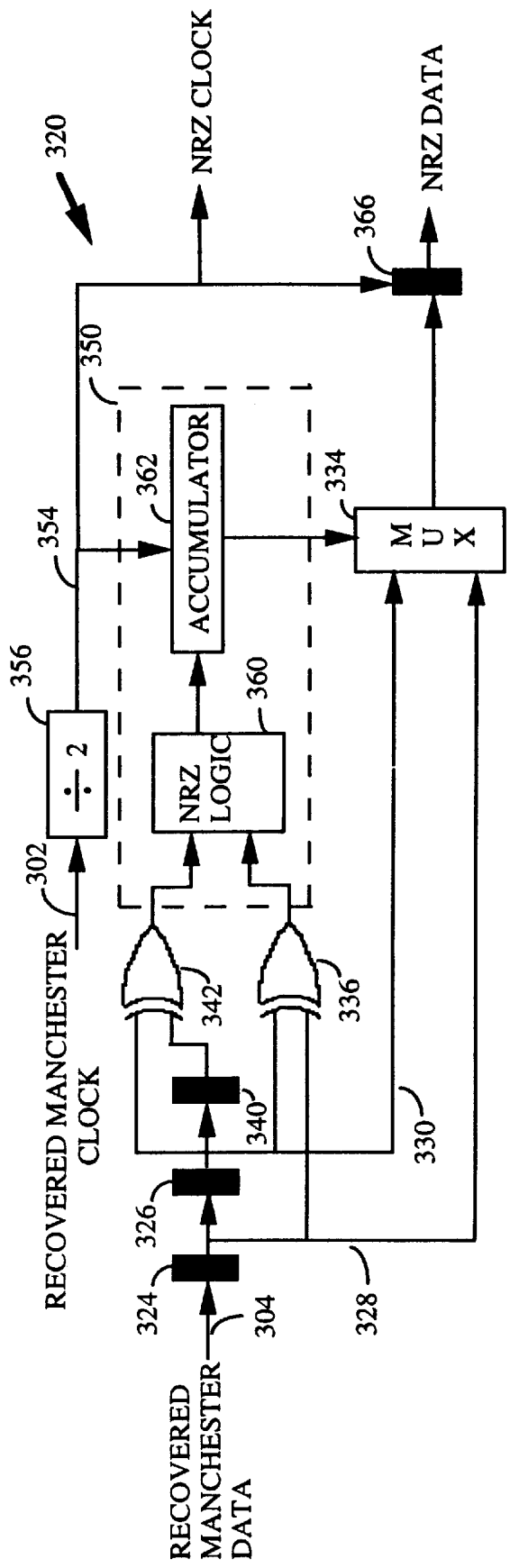
FIG. 5A provides a partially schematic representation of an NRZ decoder included within the wideband data recovery network.
FIG. 5B provides a table summarizing the operation of an NRZ logic circuit included within the NRZ decoder.

FIG. 5A provides a partially schematic representation of an NRZ decoder 320 included within the wideband data recovery network 104. Referring to FIG. 5A, the Manchester data 304 from the wideband data recovery network 104 is transferred through input shift registers 324 and 326, from which are output successive pairs of Manchester symbols on signal lines 328 and 330. Each pair of Manchester symbols is provided to multiplexer 334 and to a first XOR gate 336. The Manchester symbol 330 is also provided to a second XOR gate 342, and is further passed through input shift register 340. As is indicated by FIG. 5A, the output of register 340 is also provided to the second XOR gate 342.

In a preferred embodiment the NRZ decoder 320 includes a random walk filter (RWF) 350 disposed to recover the NRZ data and clock phase in response to the outputs of XOR gates 336 and 342. The NRZ decoder 320 is also provided with the NRZ bit clock 354, which is obtained by passing the recovered Manchester clock signal 302 through a divide-by-two circuit 356. However, direct Manchester to NRZ data conversion may not be performed solely on the basis of the timing information inherent within the NRZ bit clock 354, since there exists a 180 degree phase ambiguity between the Manchester clock 302 and the NRZ bit clock 354. In accordance with the invention, this phase ambiguity is resolved in the RWF 350 by relying on a particular error-detection property inherent of the recovered Manchester data 304. Namely, it is characteristic of a Manchester data stream that the XOR of successive Manchester symbols is always unity.

Referring to FIG. 5A, each successive pair of Manchester symbols 328 and 330 correspond to a pair of possible NRZ decoded data values. The RWF 350 is operative to select one of these NRZ values via multiplexer 334 by processing the recovered Manchester data to determine the most likely NRZ sample phase. Specifically, NRZ logic 360 within the RWF 350 accepts the outputs from XOR gates 342 and 336, which are hereinafter respectively referred to as phase validity indicators Phase 1 (P1) and Phase 2 (P2). The phase validity indicators P1 and P2 are identified with the two possible NRZ data bits 330 and 328, respectively, provided to multiplexer 334. On the rising edge of the recovered NRZ clock 354, an accumulator 362 within the RWF 350 is provided with an incrementing value (INC) incremented from NRZ logic 360.

In the preferred embodiment the incrementing value (INC) is either 0 or ±1, and is produced by the NRZ logic 360 by analyzing the phase validity indicators P1 and P2 in accordance with the Manchester error-detection property mentioned above. It is noted that for any given three successive Manchester symbols, P1 is derived by XOR'ing the first and second symbols, and P2 generated by XOR'ing the second and third symbols. The phase validity indicators P1 and P2 are "correct" when set equal to one, since this satisfies the Manchester error-detection constraint that the XOR of successive symbols be unity. When P1 is correct and P2 is incorrect, the accumulator 362 is incremented. For the converse state (i.e., P1=0 and P2=1) the accumulator 362 is decremented. If P1 and P2 are of the same value, the accumulator 362 is neither incremented nor decremented. FIG. 5B provides a table summarizing this mode of operation of the NRZ logic 360.

In an exemplary implementation the accumulator 362 is 6-bits wide, and hence saturates at −31 or +32. The correct NRZ symbol is selected by multiplexer 334 based on the sign of the value stored within the accumulator 362. In particular, a positive accumulated value results in the Manchester symbol on signal line 330 being provided to output register 366, while multiplexer 334 passes the Manchester symbol on line 328 to register 366 in response to negative accumulated value.

The NRZ decoder 320 is advantageously designed to be self-synchronizing. That is, the decoder 320 does not require initialization upon the start of system operation. In addition, the worst case "walk" to achieve the correct NRZ phase is 32 for implementations of the RWF 350 which include a 6-bit accumulator.

In a preferred implementation the serial stream of NRZ data from output register 366 may include messages of various formats. In the following section a novel system and method is described for extracting industry-standard wideband message information from the serial NRZ data.

IV. Wideband Message Processing

I. Structural Overview

Figure 6:
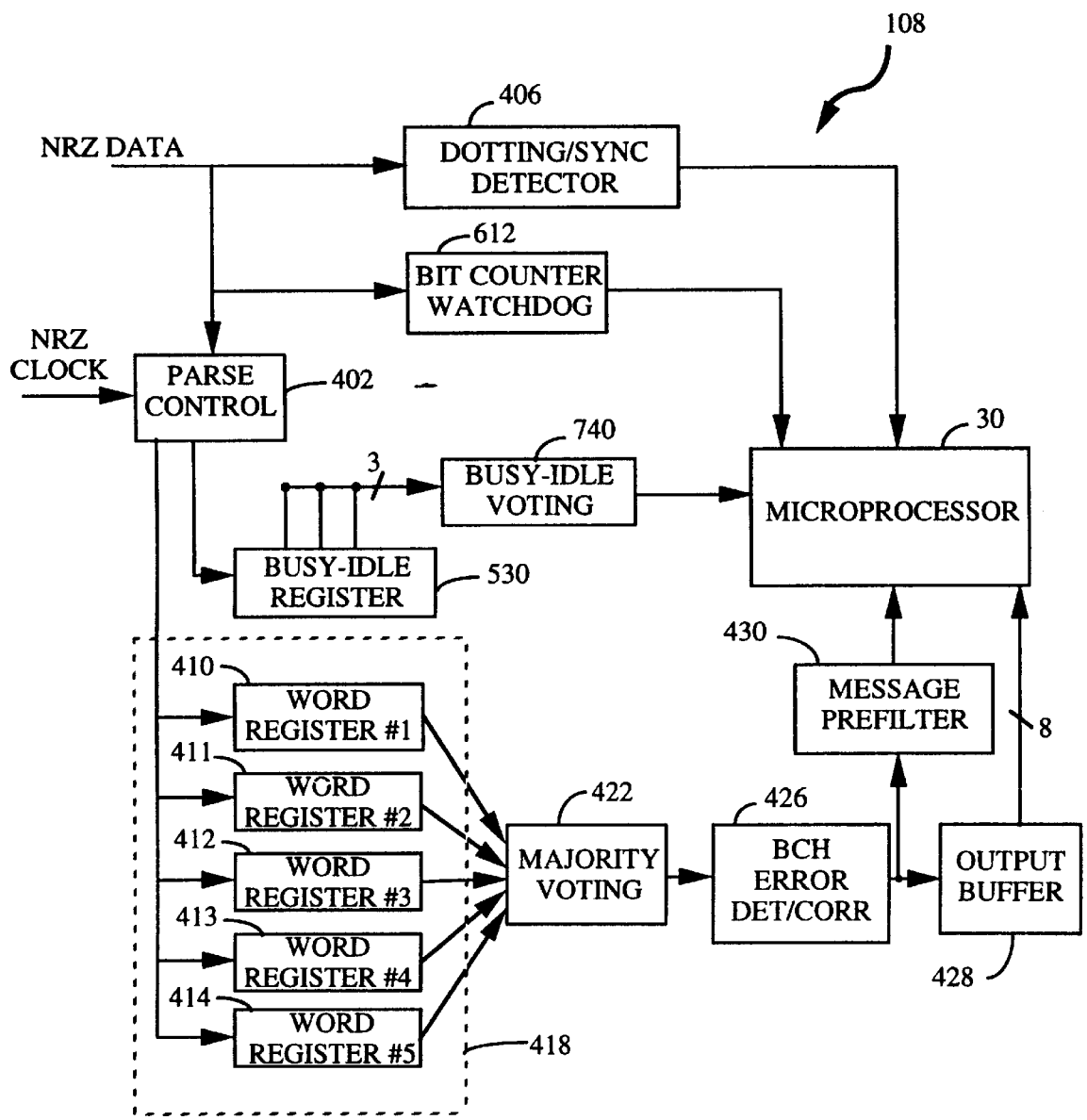
FIG. 6 provides a block diagram of a wideband message processing section of the dual-mode digital communications unit.

FIG. 6 provides a block diagram representation of the wideband message processing section 108 of the digital receiver 16. The wideband message processing section 108 accepts serial NRZ data from the wideband data recovery network 104, identifies word frames within the data, corrects bit errors via voting and error correction, and presents the data to the microprocessor 30. The wideband message processing section 108 may also be configured to reduce the load of the microprocessor 30, and hence also its power consumption, by filtering those incoming control messages not specifically addressed to the communications unit 10.

In an exemplary implementation the wideband message processing section 108 is configured to receive and identify messages within the IS-95 wideband data stream transmitted over the forward analog control channel (FOCC) and the forward voice channel (FVC) during operation of the receiver 16 in the digital FM mode. As was mentioned in the Background of the Invention, these FOCC and FVC wideband data streams are often processed by a programmed general purpose microcomputer or microprocessor. In contrast, the present invention provides a special purpose architecture for processing the FOCC and FVC data streams in a manner designed to overcome the inefficiencies associated with existing wideband processing approaches.

Referring to FIG. 6, the wideband message processing section 108 includes a parse control circuit 402 for receiving, at the rate of the NRZ clock 354, the demodulated serial stream of NRZ data from the output register 366 of the NRZ decoder 320. The NRZ data stream from register 366 is also provided to a dotting/sync detector 406 for detecting dotting and word sync sequences within the FOCC and FVC wideband data streams.

As mentioned above, IS-95 specifies that dotting and word sync sequences are to accompany each word block (i.e., repetitions of a given message word) sent via the FOCC and FVC wideband data streams. On the FOCC, a 10-bit dotting sequence (1010101010) and an 11-bit word sync sequence (1100010010) immediately precede each word block. Each word block includes five repetitions of a 40-bit message word. A busy-idle bit is located at the beginning of each dotting sequence, at the beginning of each word sync sequence, as well as at various other specified bit positions in the FOCC wideband data stream. On the FVC, a 37-bit dotting sequence and an 11-bit word sequence precede each repetition (except the 1st repetition) of a word within a give word block. A 101-bit dotting sequence and an 11-bit word sequence precedes the first word repetition in each word block transmitted using the FVC wideband stream. The manner in which the dotting/sync detector 406 operates to detect these dotting and word sync sequences is described below with reference to FIG. 8.

The serial NRZ data is thus provided to the parse control circuit 402 in one of two formats, depending on whether the FOCC or FVC is active. The parse control circuit 402, as well as the remaining elements of the message processing section 108, are set to either FOCC or FVC mode in accordance with the state of a dedicated control register of the microprocessor 30. As mentioned above, the continuous wideband data stream (10 kbps+/−0.1 kbps) of the FOCC includes three discrete information streams: Stream A, Stream B, and the Busy-Idle stream. When in FOCC mode, the wideband message processing section 108 monitors the Busy-Idle stream, and either Stream A or Stream B. Whether Stream A or Stream B is monitored by the wideband message processing section 108 is determined by examining the least significant bit of the Mobile Identification Number (MIN) loaded into dedicated MIN registers of the microprocessor 30. A logical '0' in the MIN register corresponding to the least significant MIN bit indicates that Stream A is to be monitored, while the presence of a logical '1' therein indicates that stream B is to be monitored. The wideband data stream transmitted over the FVC includes only a single information stream.

Following detection of either the FOCC or FVC dotting and word sync sequences by the dotting/sync detector 406, the message word repetitions of the accompanying word block are sequentially loaded by the parse control circuit 402 into the word registers 410–414 of a word register circuit 418. That is, the first word repetition of the word block is loaded at the rate of the NRZ clock 354 into word register 410, the second repetition is loaded into register 411, and so on.

A majority vote circuit 422 is activated upon receipt of word repeat register "full" indication from the word register circuit 418. The majority vote circuit 422 performs a bit-by-bit, three out of five majority vote in order to generate a reconstructed message word. The resultant serial stream of reconstructed message words is then passed to a BCH error detection/correction module 426. If less than five valid word repetitions (e.g., 3 or 4) of a given word block ultimately become loaded into the word register circuit 418, the majority vote circuit may optionally be configured to effect partial voting using the valid words. For example, a "1" could be declared for a given bit position in the reconstructed word if there exist at least two word repetitions 410–414 which also include a "1" in the same bit position. Otherwise, the bit in the reconstructed word is declared to be a "0".

Similarly, parse control circuit 402 serially loads the busy-idle bits into busy-idle register 432. The busy-idle voting circuit 434 compares the last three busy-idle bits received, and performs a simple two-out-of-three vote to determine the busy-idle status of the active channel. The resulting decision is passed to microprocessor 30 for appropriate action.

Within the BCH error detection/correction module 426, a BCH (Bose-Chaudhuri-Hocquenghem) code is used to detect and correct certain bit error patterns in the manner described below. The resultant corrected message words then provided to an output message buffer 428.

As mentioned above, while disposed in the FOCC mode the communications unit 10 is required to decode and process the following messages received from its base station: Mobile Station Control Messages, Overhead Messages, and Control Filler Messages. In accordance with one aspect of the invention, the message prefilter 430 conserves the computational resources and power of the microprocessor 30 by only providing selected messages thereto for processing. Details of the message screening procedure effected by the message prefilter 430 are provided below.

3. Detailed Operational Description

Figure 7:
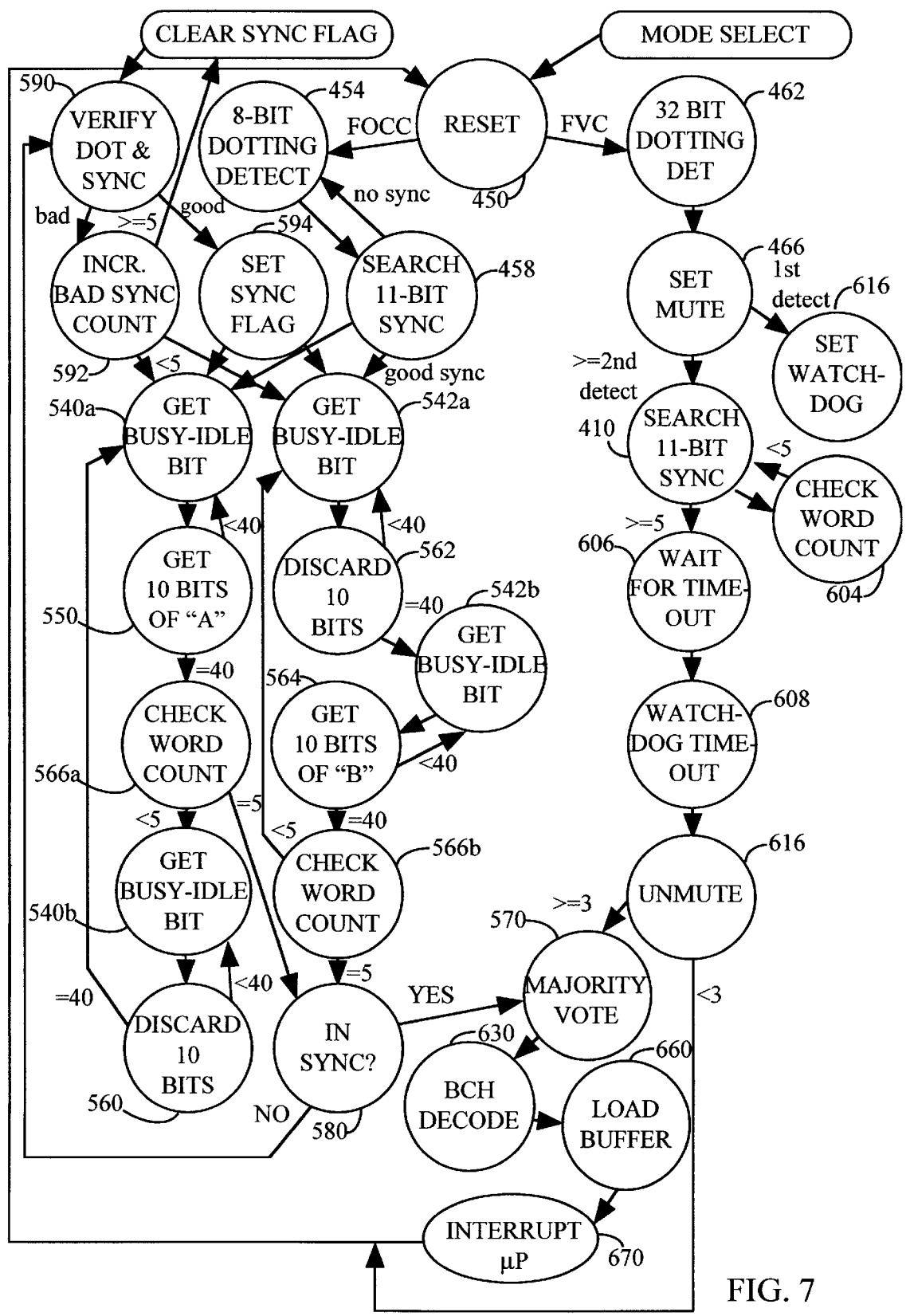
FIG. 7 is a functional flow diagram representative of the operation of the wideband message processing section.

Turning now to FIG. 7, a functional flow diagram is provided of the operation of the wideband message processing section 108. Upon reset (step 450) of the communications unit 10 a search is begun for either the dotting sequence associated with the selected operational mode (i.e., FOCC or FVC). When FOCC mode has been selected, the dotting/sync detector 406 enters an FOCC dotting search state in which it searches for the 10-bit FOCC dotting sequence following the busy/idle bit at the beginning of each word block (step 454). Specifically, while in the FOCC dotting search state (step 454) the dotting/sync detector 406 attempts to identify the end of the last eight bits of the 10-bit dotting sequence. If the end of this 8-bit sequence is detected, then an FOCC word-sync search state (step 458) is entered for the next 16 bits received by the dotting/sync detector 406 from the register 366. An exemplary implementation of the dotting/sync detector 406 configured to effect FOCC dotting and word-sync searches is described below with reference to FIG. 8.

When FVC mode has been selected, the dotting/sync detector 406 enters an FVC dotting search state (step 462) in which it searches for a 32 bit segment of the 101-bit FVC dotting sequence preceding the first word repetition of each word block. Upon successful detection of such a 32-bit segment, the dotting/sync detector 406 provides a mute interrupt to the microprocessor 30 (step 466). This results in muting of the audio signal which would otherwise be generated by an audio transducer (not shown) within the communications unit 10. An FVC word sync search state (step 470) then remains in effect during the time in which the next 32 bits are received by the dotting/sync detector 406 from the register 366.

Figure 8:
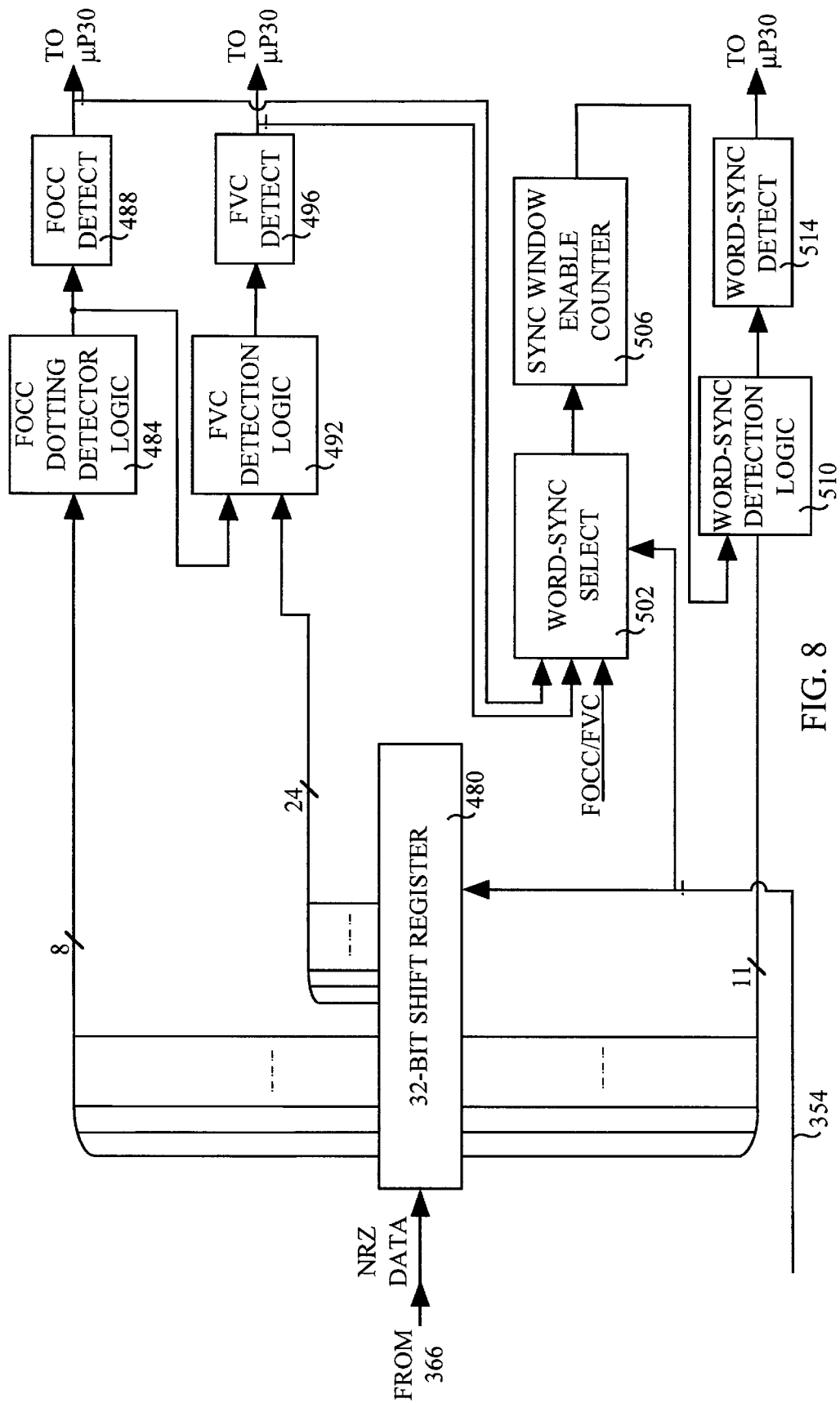
FIG. 8 is a schematic representation of an exemplary implementation of a dotting/sync detector within the wideband message processing section.

Turning now to FIG. 8, a schematic representation is provided of an exemplary implementation of the dotting/sync detector 406. The serial NRZ data from the register 366 is shifted into a 32-bit shift register 480 at the rate of the recovered NRZ clock 354. When the initial 8 bits of the 32-bit shift register 480 correspond to an alternating 1/0 dotting sequence, the output of an FOCC detection logic circuit 484 assumes a predefined logical state. During FOCC mode operation, this results in FOCC dotting detection register 488 providing an FOCC dotting detection signal to the microprocessor 30.

The dotting/sync detector 406 further includes an FVC detection logic circuit 492. The FVC detection logic circuit monitors the remaining 24 bits of the 32-bit shift register. When these 24 bits register the alternating one/zero dotting sequence, and the output of FOCC detection logic circuit 484 has assumed the predefined logical state mentioned above, the output of the FVC detection logic circuit 492 also assumes a predefined logical state. During FVC mode operation, this results in FVC dotting detection register 496 providing an FOCC dotting detection signal to the microprocessor 30.

Referring to FIG. 8, a word-sync select circuit 502 is seen to be coupled to the outputs of the FOCC and FVC dotting detection registers 488 and 496. When an FOCC/FVC signal from the microprocessor 30 indicates the FOCC mode has been selected, the word-sync select circuit 502 triggers a sync window counter 506 upon generation of the FOCC dotting detection signal. Upon being so triggered, the sync window counter 506 enables word sync detection logic 510 for the duration of a word sync detection window spanning a predetermined number of cycles (e.g., 500) of the NRZ clock 354. During this word sync detection window, the word sync detection logic 510 monitors the initial 11 bits of the 32-bit shift register 488 for the presence of the known 11-bit word synchronization sequence (11100010010). If at least two valid occurrences of the 11-bit word sync sequence separated by a predetermined number of bits are detected within the word sync detection window, the output of the word sync detection logic 510 assumes a logical state indicative of the acquisition of word synchronization. In response, word sync detection register 514 provides a word sync detection signal to the microprocessor 30. Synchronization will be considered to be lost during FCC after detection of five consecutive erroneous sync sequences.

During FVC mode, synchronization shall be considered obtained when 32 bits of dotting precede a valid sync sequence. A gap of a predefined number of bits (e.g., 32 bits) may be permitted between the valid dotting and sync sequences as a means of accommodating minor timing perturbations (e.g., bit slips) arising during dotting sequence recovery. As an example, synchronization could be considered to be obtained when a valid 32-bit dotting sequence is followed by: a clock slip (i.e., incorrect dotting bit), 31 bits of valid dotting sequence, and an acceptable sync sequence. In an exemplary implementation a predefined bit register (FVC_SYNC) of the microprocessor 30 is set to indicate the successful achievement of synchronization, which results in the parse control circuit 402 enabling message word repetitions to be stored within the word register circuit 418. The FVC_SYNC bit register is reset after the word repetitions have been received, or after approximately 1000 NRZ clock cycles, since the maximum length of an FVC word block is less than 1000 NRZ bits.

In an alternate implementation the microprocessor 30 may effectively disable the dotting/sync detector 406 from performing FOCC or FVC dotting sequence detection through issuance of valid dotting sequence detection indications. In particular, the microprocessor 30 instructs the dotting/sync detector 406 to operate as if an FOCC or FVC has already been detected. This ensures that the FOCC and FVC word-sync search states (steps 458 and 470) (see FIG. 7) will always eventually be entered subsequent to system reset (step 450).

Upon successful word sync detection (steps 410 and 458), the parse control circuit 402 begins the buffering of word repetitions within the word register circuit 419 in accordance with the state of the FOCC/FVC mode select bit registered by the microprocessor 30. When this FOCC/FVC bit indicates the FOCC mode has been selected, the 463 bits received following the last bit of the detected word sync sequence are parsed by the parse control circuit 402 in the following manner.

1) The first bit and every 10th message bit thereafter are passed to a 3-bit serial busy-idle register 530 (steps 540a,b and 542a,b of FIG. 7).

2) If the least significant bit of the Mobile Identification Number (MIN) of the communication unit is a '0', the communication unit 10 is to monitor Stream A of the received FOCC wideband data stream. In this case the next 40 data bits (with the exception of the BUSY-IDLE bits) are clocked into word register 410 (step 550), and the 40 data bits thereafter are discarded (step 560).

3) If the least significant bit of the Mobile Identification Number (MIN) of the communication unit is a '1', the next 40 bits (not including the BUSY-IDLE bits) are discarded (step 562) and the 40 bits thereafter are instead clocked into word register 410 (step 564).

4) Once the first received word repetition has been loaded into word register 410, the subsequently received bits are diverted into word register 411. This process continues until all five word registers 410–414 have been filled, and the word count pointer of the word register circuit 418 has been incremented to '5' (steps 566a,b). Once the word registers have been filled, the word buffering state is exited and the majority vote state entered (step 570) provided that the word-sync detection register 514 indicates that word synchronization has been maintained (step 580).

5) If word synchronization has not been maintained, a verify dotting and word-sync state is entered (step 590) as determined by examining the bit stream for dotting and word sync, the BAD_SYNC count is incremented and the IN_SYNC flag is cleared. If the counter is greater than 4, the state machine restarts. If dotting and word sync are found, IN_SYNC is set. If the machine does not restart, the message streams are processed. The message stream is only voted and decoded if IN_SYNC was set during collection of the repeated words.

When the FOCC/FVC bit register of the microprocessor 30 indicates the FOCC mode has been selected, the parse control circuit 402 routes to word registers 410–414 the first five word repetitions (of a received FVC 11-word block) immediately preceded by valid word-sync sequences. During FVC mode the 40 NRZ data bits following each valid word-sync sequence are sequentially clocked into word register 410–414 in accordance with the word register counter of the word register circuit 418 (step 604). Specifically, the word register counter is incremented upon the filling of each word register 410–414, and the word-sync search state (step 410) is re-entered. This process proceeds until all five word registers 410–414 are filled, at which time processing is suspended (step 606) until expiration (step 608) of a watchdog timer 612 (FIG. 6) has occurred. The watchdog timer 612 is set (step 616) following the FVC muting operation (step 406) to count for a predetermined number of NRZ clock cycles (e.g., 1000). Upon expiration (step 608) of the watchdog timer 612, any audio output device (not shown) of the communications unit 10 is unmuted (step 616) and the majority vote state (step 570) is entered if the word register counter of the word register circuit 418 is at least equal to three. If the word register counter has only been incremented to a value less than three, the reset state (step 450) is entered.

The majority vote state (step 570) is initiated upon receiving a buffer full indication from the word register circuit 418, and results in creation of a reconstructed word in the manner outlined above. Upon completion of this process, a BCH decoding/correction state is entered (step 630) is entered during which the BCH error detection/correction module 426 uses a BCH code to detect and correct certain bit error patterns. The BCH (Bose-Chaudhuri-Hocquenghem) code is a systematic linear block code in which the leading bit constitutes the most significant bit, and in which the least significant bit corresponds to the last parity check bit. The BCH code utilized in the preferred implementation includes 40 total bits, 28 information bits, and is characterized by a distance of 5.

Figure 9:
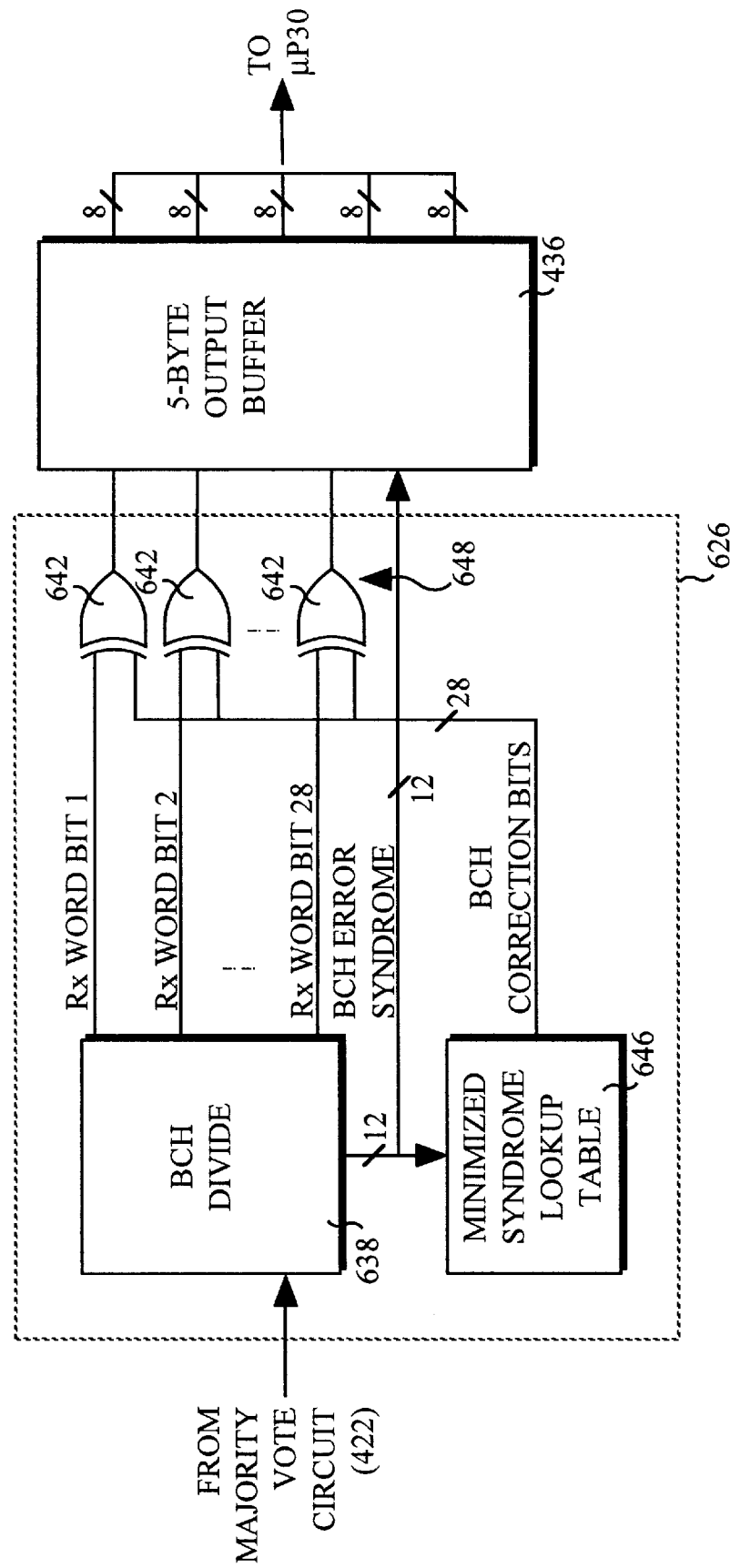
FIG. 9 is a block diagrammatic representation of a BCH error detection/correction module included within the wideband message processing section.

Referring to FIG. 9, a block diagram is provided of a preferred implementation of the BCH error detection/correction module 426. Each reconstructed word from the majority vote circuit 422 is provided to a BCH divide circuit 638 disposed to route the first 28 bits of the reconstructed word to bit correction circuitry 640. Each the first 28 bits of the reconstructed word is applied to one input of a corresponding exclusive-or (XOR) gate 642 within bit correction circuitry 640. As is discussed below, the bit correction circuitry 640 is controlled by a set of BCH correction bits provided by a minimized BCH error syndrome lockup table 646.

The BCH correction bits are produced by the minimized BCH error syndrome lockup table 646 in response to a 12-bit BCH error syndrome generated in accordance with the following polynomial:

$$g(x) = x^{12} + x^{10} + x^8 + x^5 + x^4 + x^3 + x^0$$

If the resulting 12-bit BCH error syndrome is all zeroes, the reconstructed word within the BCH divide circuit 638 is presumed correct and is through the bit correction circuitry 640 without modification. If the BCH error syndrome is not all zeroes, it is determined whether a single bit error has occurred by searching for the non-zero BCH error syndrome among the 28 error syndrome entries within the BCH error syndrome lockup table 646. Each of the 28 error syndrome entries within the lockup table 646 corresponds to a single-bit error in one of the 28 bits provided to the bit correction circuitry 640. If the non-zero BCH error syndrome matches one of the 28 entries in the lockup table 646, the corresponding one of the 28 bits of the reconstructed word is modified by the bit correction circuitry 640 before being passed to the output buffer 436 (step 660). If the non-zero BCH error syndrome is not found within lockup table 646 (i.e., a multi-bit error has occurred), the reconstructed word is passed through the bit correction circuitry 640 to the output buffer 436 without modification and a BCH multiple error flag (BCH_MULTI_ERR_EN) is set within a dedicated register of the microprocessor 30.

The output buffer 436 stores the 28 error-corrected bits generated by the correction circuitry 640, and also stores the 12-bit BCH error syndrome. At the same time that this information is being loaded into the output buffer 436, the 28 error-corrected bits are also passed to the message prefilter 430 for processing in the manner described below.

The message prefilter 430 is designed to conserve the computational resources and power of the microprocessor 30 by prescreening the messages allowed to be read thereby. This conservation of resources is effected in part by only permitting the microprocessor 30 to be interrupted to read only those messages having an address matching the communication unit 10. Upon being so interrupted, the microprocessor 30 reads the message word loaded into the output buffer 428. The message pre-screening procedure performed by the message prefilter 430 requires that the following information must be loaded into registers 686 associated with the microprocessor 30:

ü Roaming Status (1 bit)

ü Mobile Identification Number 1 (24 bits)

ü Mobile Identification Number 2 (10 bits)

Figure 10:
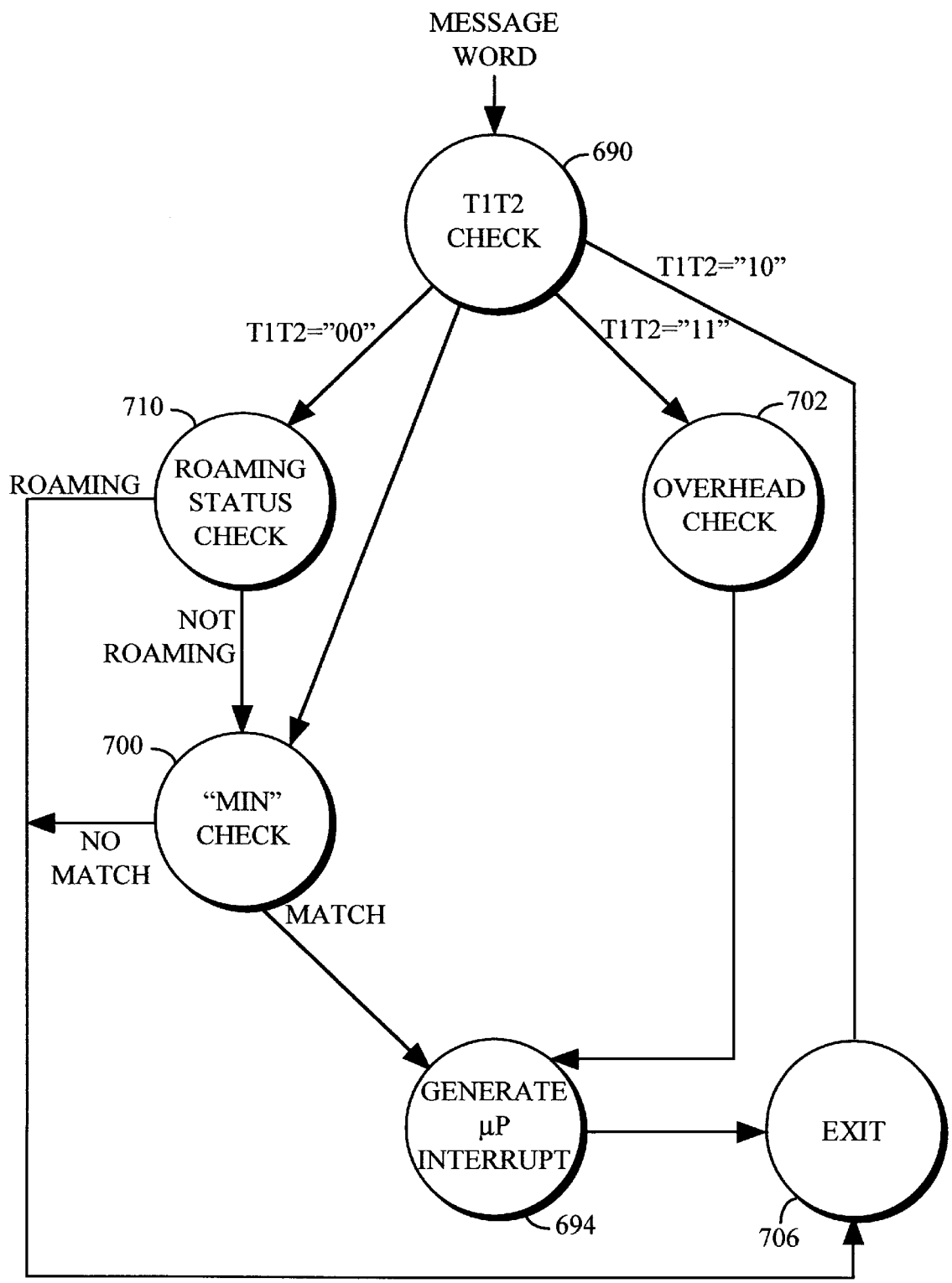
FIG. 10 provides a functional flow diagram representative of the operation of a message prefilter included within the wideband message processing section.

Turning now to FIG. 10, there is provided a functional flow diagram representative of the operation of the message prefilter 430. For each received word block, the message prefilter 430 checks its 'T1T2' bits determine the type of the IS-95 message within the word block being received (step 690). The following correspondence exists between the 'T1T2' bit values and the type of received message:

| T1T2 Bit Value | Message Type |
| --- | --- |
| 00 | single word page |
| 01 | 1st word of a multi-word message |
| 10 | mobile station control message |
| 11 | overhead message. |

The message prefilter 430 will generate an interrupt (step 694) to the microprocessor 30 if the mobile identification number (MIN) associated with the received message matches the MIN of the communications unit 10 (step 700), or if the received message is the beginning of an overhead message train. Overhead messages provide information relating to system parameters, and are sent approximately once per second. As a result of this relatively low frequency of transmission, each Overhead Message may be processed without significant consumption of computational resources. If it is determined that the communications unit 10 has already received the overhead information required for operation (step 702), then receipt of the overhead message does not result in an interrupt being generated to the microprocessor 30. In this case the message prefilter procedure is then terminated (step 706).

For paging messages, the message prefilter 430 checks the roaming status of the communications unit 10 (step 710). If the communications unit 10 is determined to be roaming, the message prefilter procedure is terminated (step 706). Otherwise, if the MIN of the paging message matches the MIN of the communications unit 10 (step 700), then an interrupt is generated to the microprocessor 30 (step 694). In the exemplary implementation the message prefilter 430 is deactivated by clearing a dedicated bit in the interrupt control register (not shown) of the microprocessor 30.

Again referring to FIG. 6, the busy-idle register 530 receives the first bit and every 10th message bit thereafter following the achievement of synchronization in FOCC mode operation. The busy-idle status bits are sent to the communications unit 10 as part of the FOCC wideband data in the bit positions specified by IS-95. The busy-idle bit is set to '0' when the FOCC channel is busy, and set to '1' when the FOCC channel is idle.

A busy-idle voting circuit 740 (FIG. 6) is disposed to examine the three most recently received busy-idle bits, which are stored in the busy-idle register 530. If at least two of these three bits are '0' (i.e, busy) then the busy-idle voting circuit 740 provides an indication that the FOCC channel is busy. Otherwise, the busy-idle voting circuit 740 indicates that the FOCC channel is idle. This indication provided by the busy-idle voting circuit is latched by the microprocessor 30 following receipt of each new busy-idle bit. In accordance with one aspect of the invention, the busy-idle indication provided by the busy-idle voting circuit 740 is used by transmitter 14 (FIG. 1) during the transmission of wideband data over the reverse control channel. This aspect of the invention is described in further detail in the following section.

V. Wideband Message Transmission

Figure 11:
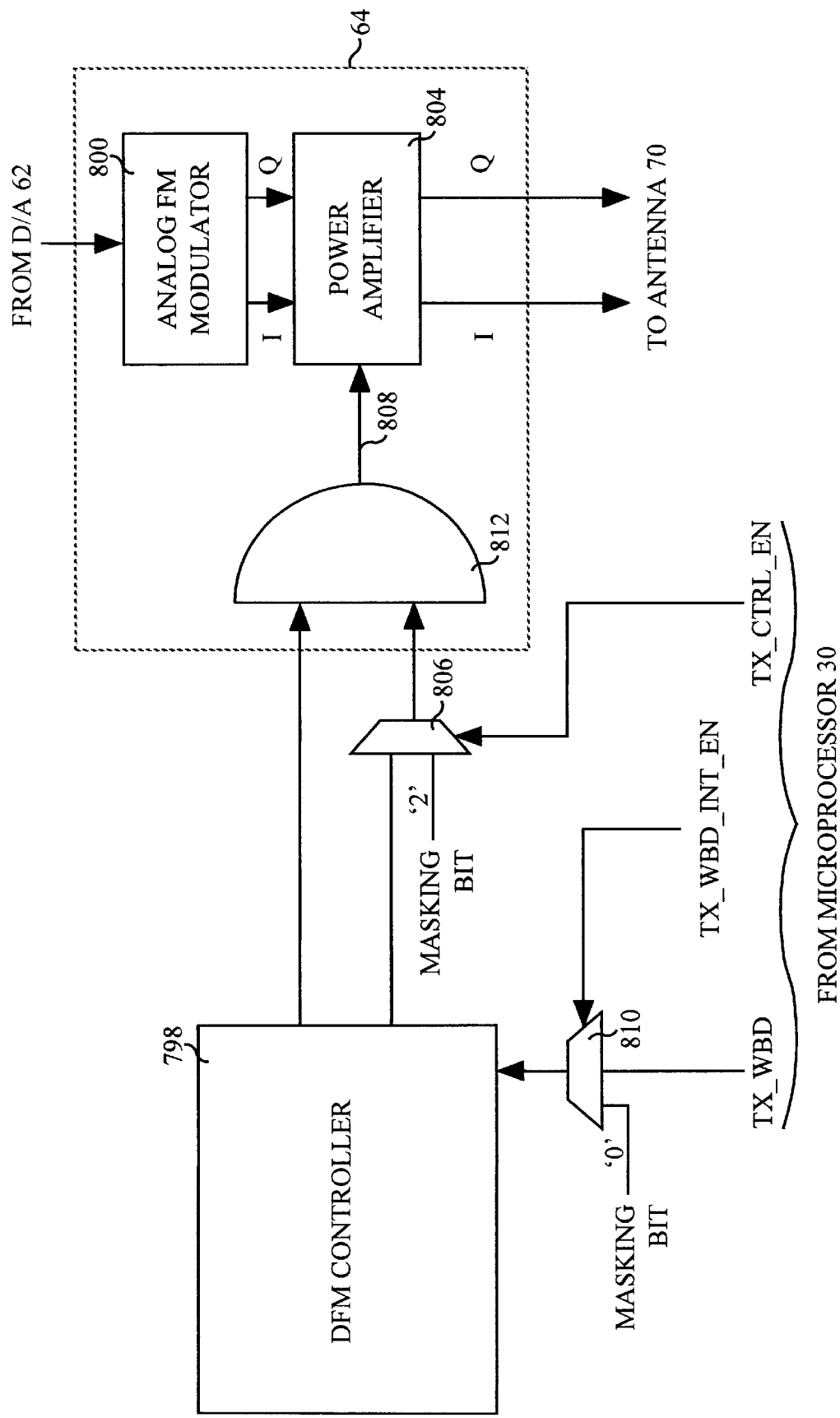
FIG. 11 is a block diagram representative of the manner in which a wideband data generator interacts with an RF transmitter during the transmission of wideband data over the reverse control channel.
Figure 12:
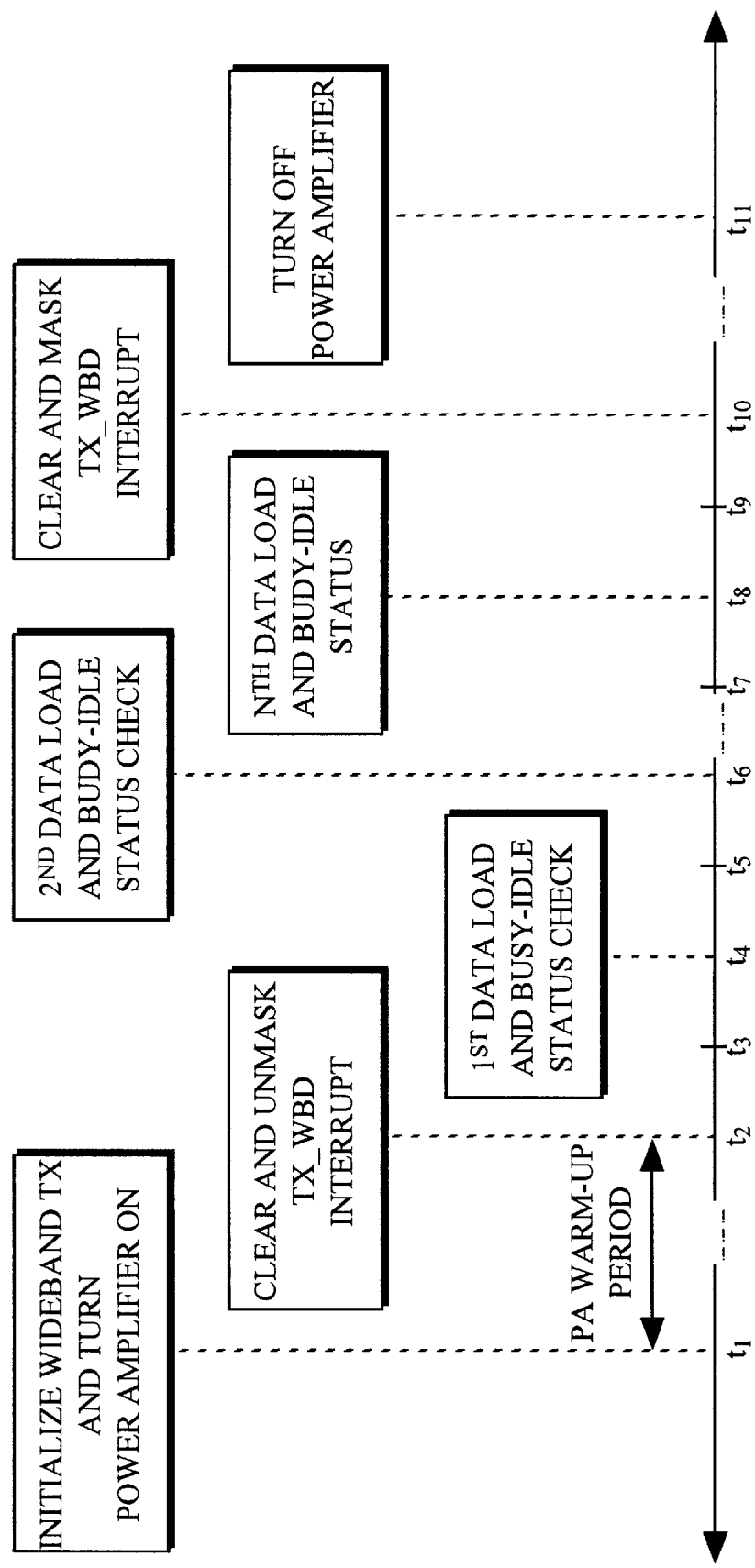
FIG. 12 is a timeline depicting the timing relationships between various events occurring during wideband data transmission.

FIG. 11 is a block diagram representative of the manner in which the wideband data generator 54 interacts with the RF transmitter 64 during the transmission of wideband data over the reverse control channel. The process of wideband data transmission is further illustrated by the timeline of FIG. 12, which depicts the timing relationship between various events occurring during wideband data transmission. In the preferred implementation of FIG. 11, wideband data transmission is controlled by a digital FM (DFM) controller 798 comprised of dedicated logic, firmware, or a special purpose processor within the wideband data generator 54. The DFM controller 798 signals the special purpose processor with wideband transmit (TX_WBD) interrupts generated at predefined intervals (e.g., every 1.6 ms.). In FIG. 12, these TX_WBD interrupts are represented as being generated at times $t_3$, $t_5$, $t_7$ and $t_9$.

Referring to FIG. 11, an analog FM modulator 800 of the RF transmitter receives the analog FM modulation signal provided by the D/A converter 62 (FIG. 1). The I and Q frequency-modulated carriers produced by the FM modulator 800 are then amplified by a power amplifier 804. As is indicated by FIG. 11, a control line 808 coupled to the output of AND gate 812 serves to turn the power amplifier 804 ON and OFF.

Turning now to FIG. 12, at time t1 a wideband transmit (TX) initialization process is performed in which the power amplifier 804 is turned on. During this process the DFM controller 798 first asserts the power amplifier ON (PA_ON) and transmit control (TX_CTRL) lines, and then the microprocessor 30 asserts the transmit control ENABLE line (TX_CTRL_EN). The assertion of TX_CTRL_EN causes multiplexer 806 to select TX_CTRL rather than the masking bit of unity, thereby effectively "unmasking" the TX_CTRL line. Since both the TX_CTRL and PA_ON lines had been previously asserted, the control line 808 becomes raised to the logical level required to turn ON the power amplifier 804. At time t2, the microprocessor 30 similarly unmasks the TX_WBD interrupt register by asserting the TX_WBD_INT_EN line applied to multiplexer 810.

After the TX_WBD interrupt occurring at t3, the first two bytes of a wideband data message to be transmitted over the reverse control channel are loaded by the microprocessor 30 (at t4) into an input buffer (not shown) of the wideband data generator 54. The DFM controller 798 then clears the pending TX_WBD interrupt, and checks the current busy-idle status (i.e, BUSY or IDLE) provided by the busy-idle voting circuit 740. If the control channel is BUSY, the DFM controller 798 causes the power amplifier 804 to be turned OFF by de-asserting PA_ON, and also resets TX_CTRL to '0'. If the control channel status is IDLE, the PA_ON line remains asserted.

Similarly, after to the interrupt occurring at t5, the next two bytes of the current wideband data message are at t6 loaded by the microprocessor 30 into the input buffer of the wideband data generator 54. The DFM controller 798 may also optionally check for errors arising during the transmission of the first two message bytes. Next, the DFM controller 798 checks the current busy-idle status provided by the busy-idle voting circuit 740 and clears the pending TX_WBD interrupt. If the control channel is BUSY, the DFM controller 798 causes the power amplifier 804 to be turned OFF by de-asserting PA_ON, and also resets TX_CTRL to '0'. Otherwise, PA_ON remains asserted. The procedure executed at t4 and t6 is repeated (e.g., at t8) until all bytes of the current message word have been transmitted.

If the busy-idle bit transitions from IDLE to BUSY before a predetermined minimum number of bits (e.g., 57) of the current message word have been transmitted, then it is presumed that the receiving base station set the control channel to BUSY because of communication with a different mobile station. Accordingly, the power amplifier 804 is turned off by de-asserting PA__ON and busy-idle status monitoring by the busy-idle majority vote circuit 740 is disabled. If the busy-idle bit transitions from IDLE to BUSY after transmission of the predetermined minimum number of bits (e.g., 57) but before transmission of a maximum predetermined number of bits (e.g., 104) of the current message word, then it is presumed that the receiving base station set the control channel to BUSY because of communication with the communications unit 10. In this case the monitoring of busy-idle status is also disabled. Finally, if the busy-idle bit does not transition from IDLE to BUSY by transmission of the predetermined maximum number of bits (e.g., 104) of the current message word, then it is presumed that the receiving base station did not receive the preceding message word bits. In this circumstance the monitoring of busy-idle status will also typically be disabled.

After the final assertion of a TX__WBD interrupt at t9, a check is made for errors occurring during transmission of the final two bytes of the current message. The pending TX__WBD interrupt is then cleared by the DFM controller 798, and the microprocessor 30 masks the TX__WBD interrupt by de-asserting TX__WBD__INT__EN. An unmodulated carrier is then transmitted for a predetermined interval (e.g., 25 ms) between t10 and t11.

At t11, the DFM controller 798 turns off the power amplifier 804 by de-asserting PA__ON, and the microprocessor clears TX__CTRL__EN in order to mask the TX__CTRL signal. The masking of the TX__CTRL line effectively prevents the DFM controller 798 from exercising further ON/OFF control of the power amplifier 804.

The present invention further contemplates unique processing of "underrun" condition occurring during wideband data transmission over the reverse control channel. Such an underrun condition may occur when, for example, the microprocessor 30 fails to load bytes of the current wideband message word as rapidly as necessary to satisfy the input data rate (e.g., 10 kbps) of the wideband data generator 798. In response to such an underrun condition, the power amplifier 804 is turned off by de-asserting PA__ON and busy-idle status monitoring by the busy-idle majority vote circuit 740 is disabled.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A digital receiver for receiving a frequency-modulated (FM) signal, said digital receiver comprising:
    a digital FM demodulator for providing a demodulated information signal in response to said FM signal;
    wideband message processing means for recovering message information from said demodulated information signal, said wideband message processing means including a word register circuit for storing message words included within said demodulated information signal and;
    means for setting said digital receiver for operation in a control channel mode and a voice channel mode, said wideband message processing means further including a dotting detector for detecting a first dotting sequence within said demodulated information signal during operation in said control channel mode and for detecting a second dotting sequence within said demodulated information signal during operation in said voice channel mode.

2. The digital receiver of claim 1 wherein said word register circuit includes a plurality of word registers for storing a corresponding plurality of said message words.

3. The digital receiver of claim 2 wherein said word register circuit includes a plurality of word registers for storing a corresponding plurality of repetitions of one of said message words, said wideband message processing means further including a decoder circuit for recovering said message information from said plurality of repetitions of said one of said message words.

4. The digital receiver of claim 1 further including means for producing an audio output in response to said demodulated information signal during operation in said voice channel mode and means for muting said audio output upon detection of said second dotting sequence.

5. The digital receiver of claim 2 wherein said wideband message processing means includes:
    a dotting detector for detecting a dotting sequence within said demodulated information signal;
    a word sync detector for detecting a word sync sequence within said demodulated information signal; and
    means for enabling storage of said plurality of message words in said plurality of word registers upon detection of said dotting sequence and said word sync sequence.

6. The digital receiver of claim 1 wherein said wideband message processing means includes means for recovering clock information from said demodulated information signal, said word register circuit being clocked using said clock information.

7. The digital receiver of claim 3 wherein said wideband message processing means further includes a majority vote circuit, coupled to said plurality of word registers, for generating a reconstructed message word by comparing corresponding bits within said plurality of repetitions of said one message word.

8. The digital receiver of claim 7 wherein said wideband message processing means further includes an error correction circuit for error-correcting said selected reconstructed message word in order to produce an error-corrected message word.

9. A digital FM communications unit comprising:
    a digital FM receiver for receiving a frequency-modulated (FM) signal, said digital receiver including:
        a digital FM demodulator for providing a demodulated information signal in response to said FM signal, and
        wideband message processing means for recovering message information from said demodulated information signal and for storing message words included within said demodulated information signal in a word register circuit, said wideband message processing means including means for extracting system status information from said message information;
    a digital FM transmitter, responsive to said system status information, for transmitting an FM communication signal; and
    a microprocessor coupled to said digital FM receiver and to said digital FM transmitter, said wideband message processing means including a message prefilter for enabling said microprocessor to be interrupted only upon receipt of ones of said message words of predefined type.

10. The digital FM communications unit of claim 9 further including means for interrupting transmission of said FM communication signal in accordance with a busy/idle status signal included within said system status information.

11. The digital FM communications unit of claim 9 wherein said word register circuit includes a plurality of word registers for storing a corresponding plurality of ones of said message words.

12. The digital FM communications unit of claim 9 wherein said word register circuit includes a plurality of word registers for storing a plurality of repetitions of one of said message words.

13. The digital FM communications unit of claim 9 further including means for setting said digital FM receiver for operation in a control channel mode and a voice channel mode, said wideband message processing means including a dotting detector for detecting a first dotting sequence within said demodulated information signal during operation in said control channel mode and for detecting a second dotting sequence within said demodulated information signal during operation in said voice channel mode.

14. The digital FM communications unit of claim 13 further including means for producing an audio output in response to said demodulated information signal during operation in said voice channel mode and means for muting said audio output upon detection of said second dotting sequence.

15. A method for recovering message information from a frequency-modulated (FM) signal, said method comprising the steps of:

receiving said FM signal;

generating a demodulated information signal upon receiving said FM signal;

storing, in a word register circuit, message words included within said demodulated information signal;

decoding said message words in order to recover said message information;

selectively enabling operation in control channel and voice channel modes;

detecting a first dotting sequence within said demodulated information signal during operation in said control channel mode; and detecting a second dotting sequence within said demodulated information signal during operation in said voice channel mode.

16. The method of claim 15 further including the steps of:

storing, in said word register circuit, a plurality of repetitions of one of said message words, comparing corresponding bits of said plurality of repetitions of said one of said message words in order to generate a reconstructed message word, and decoding said reconstructed message word.

17. The method of claim 15 further including the steps of:

producing an audio output in response to said demodulated information signal during operation in said voice channel mode, and muting said audio output upon detection of said second dotting sequence.

18. The method of claim 16 further including the steps of:

detecting a dotting sequence within said demodulated information signal, detecting a word sync sequence within said demodulated information signal, and storing said plurality of repetitions of said one of said message words in said plurality of word registers upon detection of said dotting sequence and said word sync sequence.

\* \* \* \* \*